United States Patent
McCaslin et al.

(10) Patent No.: US 7,280,316 B1
(45) Date of Patent: Oct. 9, 2007

(54) HARD DISK DRIVE SUSPENSION EMPLOYING A VERTICAL OFFSET TO REDUCE TRACK MIS-REGISTRATION INDUCED BY DISK VIBRATION

(75) Inventors: Martin John McCaslin, Pleasanton, CA (US); Khampon Sittipongpanich, Bangkok (TH); Sittipong Footrakul, Nontaburi (TH); Visit Thaveeprungsriporn, Bangkok (TH)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 11/119,364

(22) Filed: Apr. 29, 2005

Related U.S. Application Data

(63) Continuation of application No. 11/058,844, filed on Feb. 15, 2005, now abandoned, which is a continuation-in-part of application No. 10/943,804, filed on Sep. 16, 2004, now abandoned.

(60) Provisional application No. 60/504,081, filed on Sep. 19, 2003.

(51) Int. Cl.
    *G11B 5/48* (2006.01)
(52) U.S. Cl. .................................................. 360/244.8
(58) Field of Classification Search ...................... None
    See application file for complete search history.

(56) References Cited

U.S. PATENT DOCUMENTS

| | | | |
|---|---|---|---|
| 4,175,275 A | 11/1979 | Schaefer | |
| 4,208,684 A | 6/1980 | Janssen et al. | |
| 5,734,525 A | 3/1998 | Girard | |
| 5,999,369 A | 12/1999 | Shimizu et al. | |
| 6,088,192 A | 7/2000 | Riener et al. | |
| 6,778,362 B1 | 8/2004 | Davis et al. | |
| 6,920,018 B2 * | 7/2005 | Oh et al. | 360/244.8 |
| 2002/0085314 A1 | 7/2002 | Williams | |
| 2002/0131211 A1 | 9/2002 | Nishida et al. | |
| 2005/0007689 A1 | 1/2005 | Oh et al. | |
| 2005/0007701 A1 | 1/2005 | Oh et al. | |
| 2005/0007702 A1 | 1/2005 | Oh et al. | |

\* cited by examiner

*Primary Examiner*—David Davis
(74) *Attorney, Agent, or Firm*—Intellectual Property Law Office of Joel D. Voelzke

(57) ABSTRACT

Techniques for reading and writing information onto a hard disk drive are provided. According to an embodiment of the present invention, a suspension assembly for a hard disk drive includes a load beam having a mounting region, a first spring extension on a first side of the load beam, and a rigid region. The suspension assembly also includes a hinge member having a second spring extension coupling the rigid region and the mounting region on a second side of the load beam. First and second spacers are disposed between the hinge member and the mounting region of the load beam and between the hinge member and the rigid region of the load beam, respectively. A vertical offset between the first and second spring extensions predisposes the rigid region to move from a first position to a second position in response to a disk flutter.

22 Claims, 5 Drawing Sheets

HARD DISK DRIVE SUSPENSION EMPLOYING A VERTICAL OFFSET TO REDUCE TRACK MIS-REGISTRATION INDUCED BY DISK VIBRATION

CROSS-REFERENCES TO RELATED APPLICATIONS

This application is a continuation of U.S. patent application Ser. No. 11/058,844 filed Feb. 15, 2005 now abandoned, which is a continuation-in-part from U.S. non-provisional patent application Ser. No. 10/943,804, filed Sep. 16, 2004 now abandoned, which claims priority from U.S. provisional patent application No. 60/504,081, filed Sep. 19, 2003, all of which disclosures are incorporated herein by reference.

BACKGROUND OF THE INVENTION

The present invention generally relates to techniques for operating a disk drive apparatus. More particularly, the present invention provides techniques for reading and writing information onto a hard disk drive that compensate for flow induced disk vibrations, commonly called disk flutter. Merely by way of example, the present invention is implemented using vertically offset spring extensions (or hinges) in a head suspension assembly, but it would be recognized that the invention has a much broader range of applicability.

A hard disc drive (HDD) unit generally uses a spinning storage medium (e.g., a disk or platter) to store data. A read-write head is positioned in close proximity to the spinning storage medium by an HSA (Head Stack Assembly). Mounted on the HSA, a suspension assembly commonly includes a base plate, a load beam, and a flexure trace gimbal to which a slider is mounted. The slider supports the read-write head element. The load beam is generally composed of an actuator mounting region, a spring region, and a rigid region. The spring region gives the suspension a spring force or preload to counteract the aerodynamic lift force created by the spinning storage medium during reading or writing. A gimbal is mounted at the distal end of the load beam and supports the slider allowing the head to have pitch and roll movement in order to follow the irregularities of the disk surface.

Demand generally requires increased HDD storage capacity, which generally compels higher data track densities for the storage medium. Furthermore, the demand for faster rates of data seeking and accessing also leads to higher rotational speeds. A significant obstacle associated with increasing rotational speeds and storage capacity is often head positioning accuracy as the head flies above the spinning storage medium.

A significant obstacle to head positioning accuracy is disk flutter. Disk flutter is an aero-elastic instability induced by the coupling of the spinning storage medium and the air surrounding the media resulting in disk vibration modes. These flow induced vibrations can physically cause an off-track misalignment of the head to the desired track resulting in failure to access or write data on the track center. Problems associated with disk flutter become more intolerable with higher track densities and disk rotation speeds.

Accordingly, novel solutions for operating hard disk drives to substantially reduce off-track misalignment induce by disk flutter are needed.

BRIEF SUMMARY OF THE INVENTION

Techniques for operating a disk drive apparatus are provided. More particularly, the present invention provides a method and apparatus for reading and writing information onto a hard disk drive that compensate for flow induced vibrations. Merely by way of example, the present invention is implemented using such method and apparatus with a vertical offset between at least two spring extensions (or hinges) coupling an actuator mounting region to a rigid region of a load beam. The vertical offset between spring extensions (or hinges) results in an effective hinge predisposed to move in a predetermined direction.

According to an embodiment of the present invention, a method for operating a disk drive apparatus includes following by a suspension assembly from a reference position to a second position a vertical movement of a rotating disk. The suspension assembly is predisposed to move from the reference position to the second position because of a vertical offset between a first spring extension of a load beam and a second spring extension of a hinge member. A read/write head coupled to the suspension assembly is in closer alignment to a selected track during the vertical movement in the second position than if the first and second spring extensions are substantially co-planar (e.g., insignificant or no vertical offset).

According to another embodiment of the present invention, a suspension assembly for a hard disk drive includes a load beam having a mounting region, a first spring extension on a first side of the load beam, and a rigid region. The suspension assembly also includes a hinge member having a second spring extension coupling the rigid region and the mounting region on a second side of the load beam. First and second spacers are disposed between the hinge member and the mounting region of the load beam and between the hinge member and the rigid region of the load beam, respectively. A vertical offset between the first and second spring extensions predisposes the rigid region to move from a first position to a second position in response to a disk flutter.

According to yet another embodiment of the present invention, a suspension assembly for a hard disk drive includes a four layer region and a three layer region. The four layer region includes a base plate, a hinge member, mounting region of a load beam, and a first spacer. The three layer region includes a rigid region of the load beam, a second spacer, and the hinge member. The four layer and three layer regions are coupled together by a first spring extension of the load beam and a second spring extension of the hinge member. The first spring extension is disposed away from the second spring extension by a vertical offset of at least about 10 microns.

According to another embodiment of the present invention, a hard disk apparatus includes a load beam having a mounting region, first spring extension on a first side, and a rigid region. A hinge member couples the mounting region and rigid region of the load beam on a second side by a second spring extension. The second side is opposite the first side about a longitudinal axis of the load beam. A first spacer is disposed between hinge member and the mounting region, and a second spacer is disposed between the hinge member and the rigid region. These spacers provide an offset in a first direction (i.e., a direction perpendicular to a rotating platter) between the first and second spring extensions of at least about 10 microns. The hard disk apparatus also includes a gimbal that is coupled to the load beam and to a read/write head.

Many benefits are achieved by way of the present invention over conventional techniques. For example, the present technique provides an easy to use process that relies upon conventional technology. Additionally, the present invention uses a novel technique to compensate for disk vibrations, thereby reducing track mis-registration. Depending upon the embodiment, one or more of these benefits may be achieved.

These and other benefits will be described in more throughout the present specification and more particularly below.

Various additional objects, features, and advantages of the present invention can be more fully appreciated with reference to the detailed description and accompanying drawings that follow.

DETAILED DESCRIPTION OF THE INVENTION

Techniques for operating a disk drive apparatus are provided. More particularly, the present invention provides a method and apparatus for reading and writing information onto a hard disk drive that compensate for flow induced vibrations.

Figure 1:
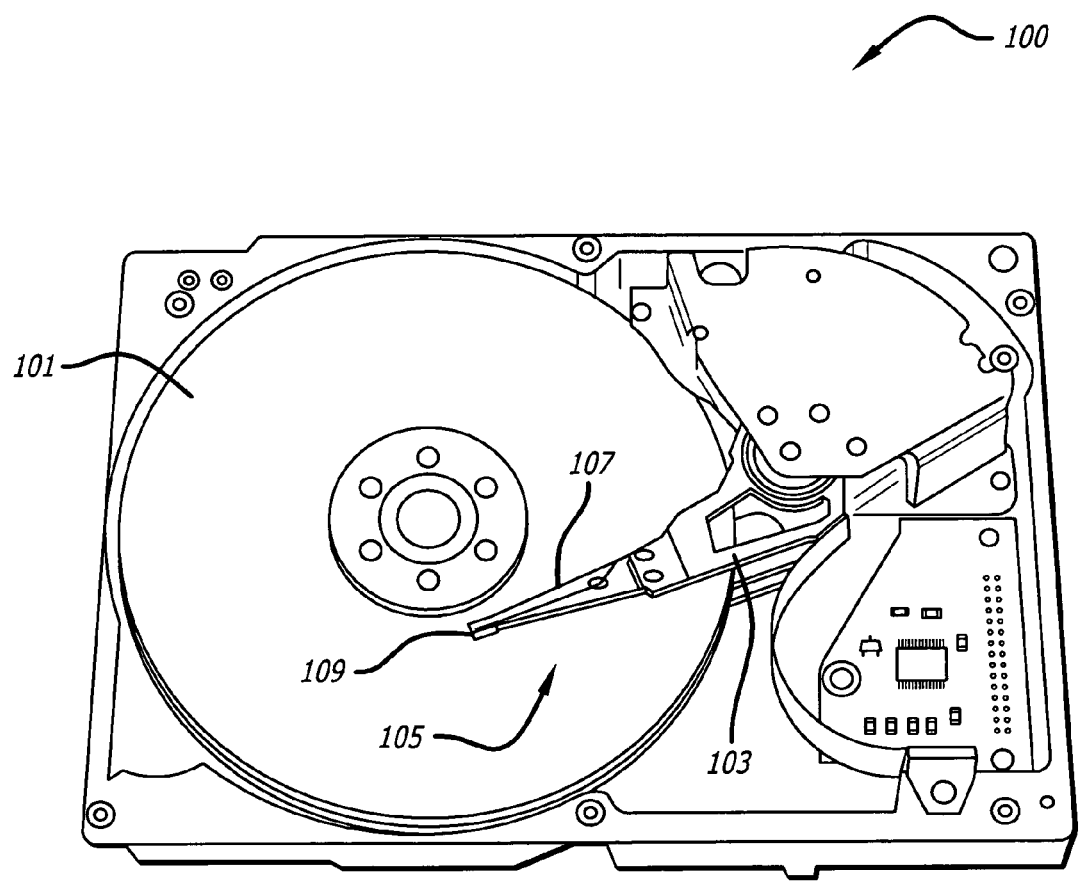
FIG. 1 is a simplified diagram of a disk drive apparatus according to an embodiment of the present invention.

FIG. 1 is a simplified diagram of a disk drive apparatus 100 according to an embodiment of the present invention. Apparatus 100 includes at least one disk 101 (e.g., one, two, three, or more disks), at least one actuator arm 103 (e.g., one, two, three, or more actuator arms), and at least one suspension assembly 105 (e.g., one, two, three, or more suspension assemblies). Each suspension assembly is composed of a load beam 107, with spring extensions, and a flexure trace gimbal assembly 109. The first and second spring extensions are disposed apart by an offset using interlayer spacers. The suspension assembly, with trace gimbal assembly and read/write head, may be referred to as a Head Gimbal Assembly (HGA). This diagram, as well as other diagrams provided herein, is merely an example, which should not unduly limit the scope of the claims herein. One of ordinary skill in the art would recognize many other variations, modifications, and alternatives.

Disk 101, commonly called a platter, rotates about a fixed axis (or spindle) from about 5,000 rpm up to about 15,000 rpm depending upon the embodiment. Disk 101 stores information and thus often includes a magnetic medium such as a ferromagnetic material. But, it can also include optical materials, common coated on surfaces of the disk, which become active regions for storing digital bit information. The aggregate storage capacity of disk 101 will vary with track density and disk diameter. Disk 101 stores information in tracks which can be in a range of about 50,000 tracks per inch (TPI) to about 200,000 TPI, or more. The diameter of disk 101 can be 5.12 inches (e.g., for a 5.25 inch drive), 3.74 inches (e.g., for a 3.5 inch drive), or less than 2.5 inches, or even less than 1.8 inches or 1.0 inch.

Suspension assembly 105, which overlies (or underlies) a surface of disk 101, operates and controls a slider coupled to a read/write head (not shown). Flexure trace gimbal assembly 109 is attached to suspension assembly 105 which is in turn is connected to actuator arm 103. Actuator arm 103 is connected to a voice coil motor or VCM, which moves suspension assembly 105 about a pivot point in an annular manner. The VCM can move at frequencies from DC up to about 1 kHz. Preferably, for higher track density, e.g., 200,000 TPI, the control bandwidth can approach 5 kHz, but can also be greater in certain embodiments.

Figure 2A:
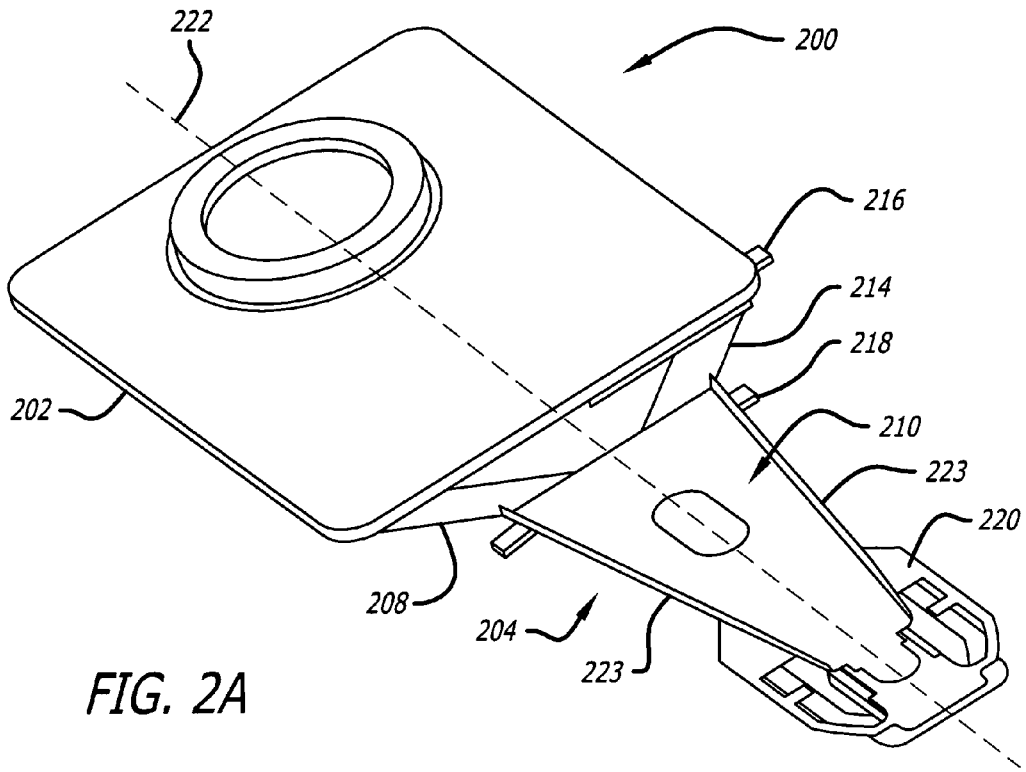
FIGS. 2A and 2B are simplified top and bottom views of a suspension assembly according to an embodiment of the present invention.
Figure 2B:
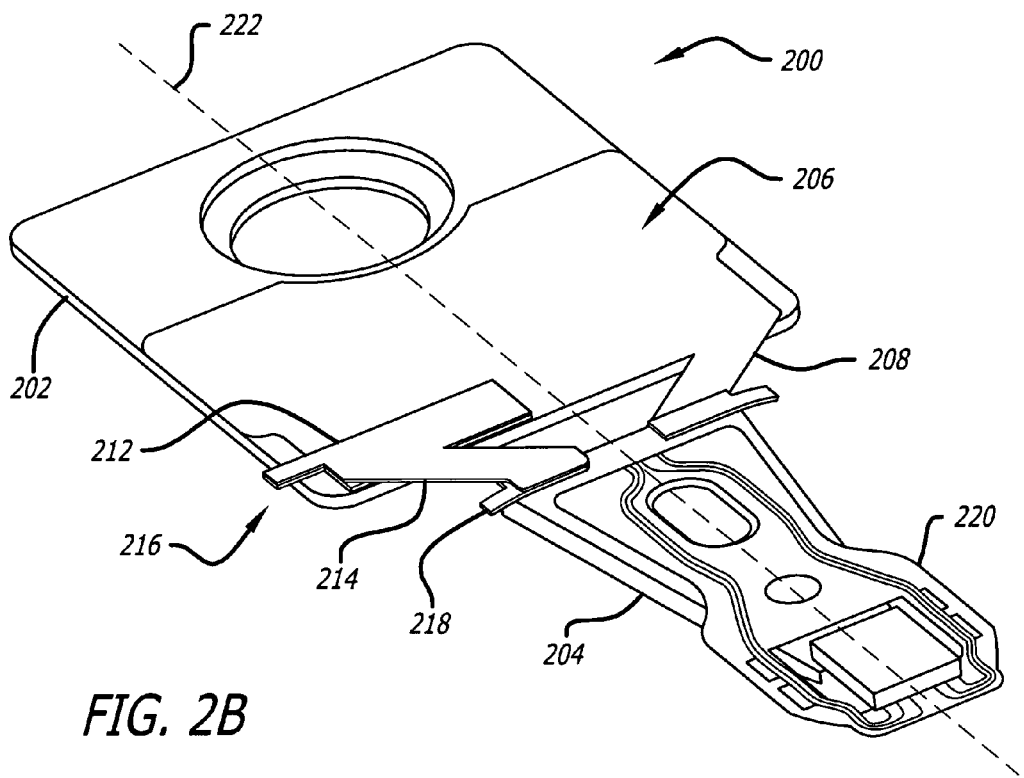
Figure 3:
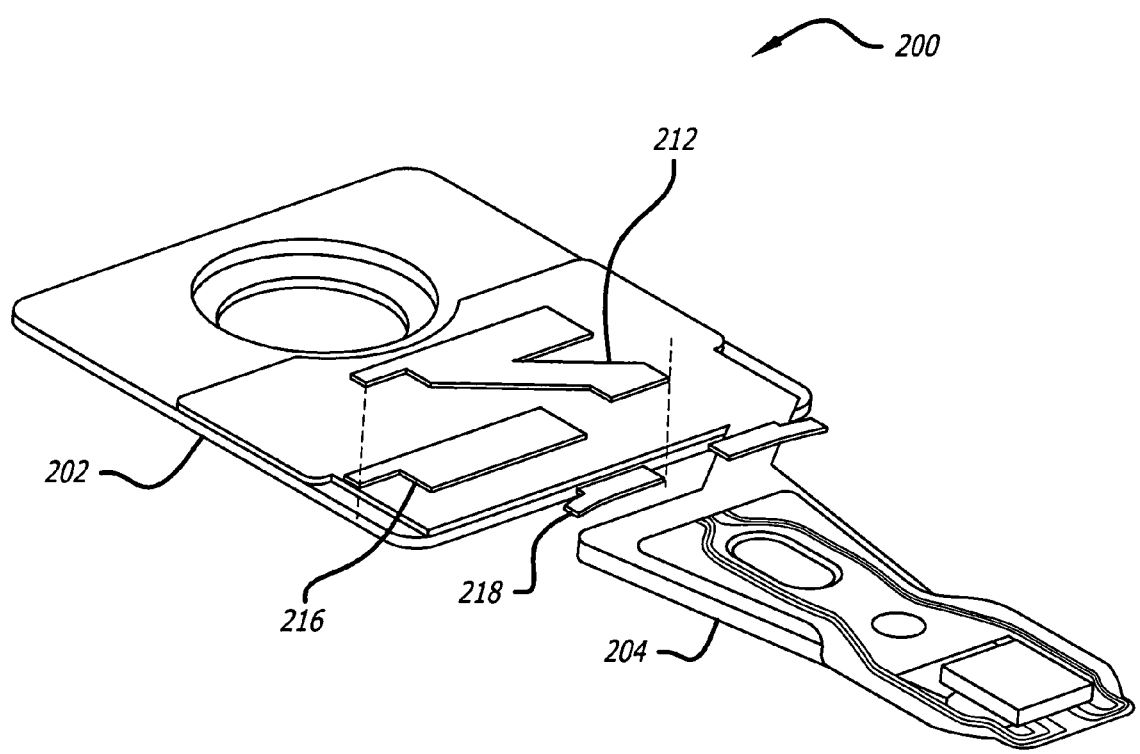
FIG. 3 is simplified inverted exploded view a suspension assembly according to an embodiment of the present invention.

FIGS. 2A and 2B are simplified views of a suspension assembly 200 according to an embodiment of the present invention. FIG. 3 is simplified inverted exploded view a suspension assembly 200. These diagrams are merely examples, which should not unduly limit the scope of the claims herein. One of ordinary skill in the art would recognize other variations, modifications, and alternatives.

Suspension assembly 200 includes a base plate 202, load beam 204, hinge member 212, spacers 216 and 218, and flexure trace gimbal assembly 220. Load beam 204 includes a mounting region 206, a first spring extension 208 on a first side of the load beam, and a rigid region 210. As illustrated in FIGS. 2A and 2B, load beam 204 is asymmetric about longitudinal axis 222 due to the first spring extension 208. Base plate 202 is coupled to mounting region 206, typically by way of laser spot welding. There can be one or more intermediate layers between coupled base plate 202 and mounting region 206, such as a layer of epoxy. Hinge member 212 includes a second spring extension 214 coupling the rigid region 210 and the mounting region 206 on a second side of the load beam 204. The second side being opposite the first side about a longitudinal axis 222 of the load beam 204. Load beam 204 also includes edge rails 223 along a length of the rigid region 210. Edge rails 223 provide stiffness to the load beam. In alternative embodiments, the load beam may not have edge rails.

The first and second spring extensions 208, 214 provide the suspension assembly with a spring force or preload to counteract the aerodynamic lift force created by a spinning medium during reading or writing to an HDD. First and second spring extensions 208, 214 can extend lengthwise in a range of about 400 microns to about 1000 microns. Preferably, but not necessarily, spring extensions 208 and 214 are of equal length. Additionally, in the absence of disk vibrations, first and second spring extensions 208, 214 are substantially oriented with a 0° roll angle, or about a 0° roll angle, with respect to a plane defined by a disk or platter. Thus, an operating attitude of the load beam 204 is substantially at a 0° roll angle. Hinge member 212, and accordingly second spring extension 214, can be comprised of a springing metal layer or any other material providing a suitable spring relationship between load beam 204 and base plate 202. Extra material can be added to hinge member 212 in contact with mounting region 206, as depicted in FIG. 2B, and rigid region 210 to accommodate spot welding for secure, rigid connections.

A first spacer 216 is disposed between hinge member 212 and the mounting region 206 of the load beam, and a second spacer 218 is disposed between the hinge member 212 and the rigid region 210 of the load beam. The first and second spacers 216, 218 provide a vertical offset between the first and second spring extensions. In this embodiment, spacers are used on both sides of the gap between the mounting region 206 and rigid region 210 of load beam 204 so that second spring extension 214 is level and parallel to first spring extension 208. Spacers 216 and 218 can be comprised of a metal layer, resin layer, molded plastic, or any combination thereof, and act to rigidly couple the hinge member 212 at mounting region 206, as well as at rigid region 210 of load beam 204. In an embodiment of the present invention, first and second spacers 216, 218 can be formed from a single spacer member that is singulated to form each spacer. FIGS. 2A and 2B illustrate a space member already in a singulated state. In another embodiment, the second spacer can extend entirely across a width of load beam 204 (i.e., from a first side to a second side of the load beam 204) to mass balance the suspension assembly 200. This extension of the spacer 218 can be interrupted, as shown in FIG. 2B, or continuous. In a specific embodiment, second spacer 218 is symmetrical about longitudinal axis 222. A balanced mass distribution of the moveable portion of the suspension, or the portion that is disposed beyond the spring extensions 208 and 214, results in improved symmetric vibration mode shapes, and thus reduces windage excited off-track components as they relate to a track mis-registration (TMR) budget.

The vertical offset between first spring extension 208 and second spring extension 214 results in an effective hinge predisposed to move in a direction favoring a reduction in the inherent off-track between head transducer and magnetic track on the disk, in the presence of disk vertical vibrations (i.e., disk flutter). However, in order to do so, the vertical offset should bring an inner disk spring extension (i.e., the spring extension positioned nearest to the axis of rotation of the disk) closer to the plane of the rotating disk than the outer disk spring extension (i.e., the spring extension positioned farthest from the axis of rotation of the disk). The range of the vertical offset can be in the range of about 10 microns to about 120 microns, preferably about 30 microns to about 70 microns, permitting conventional laser spot welding through three or four layers. It should be noted that in the absence of disk vibration, the operating attitude of the load beam 204 is substantially at a 0° roll angle with respect to a plane defined by the rotating platter. That is to say, the load beam is without a tilt from a first side to a second side about longitudinal axis 222, which avoids the undesirable introduction of inherent flow induced axial, torsional, and lateral forcing functions that exacerbate the problem of trying to keep suspension related windage off-track amplitudes minimized.

Figure 4:
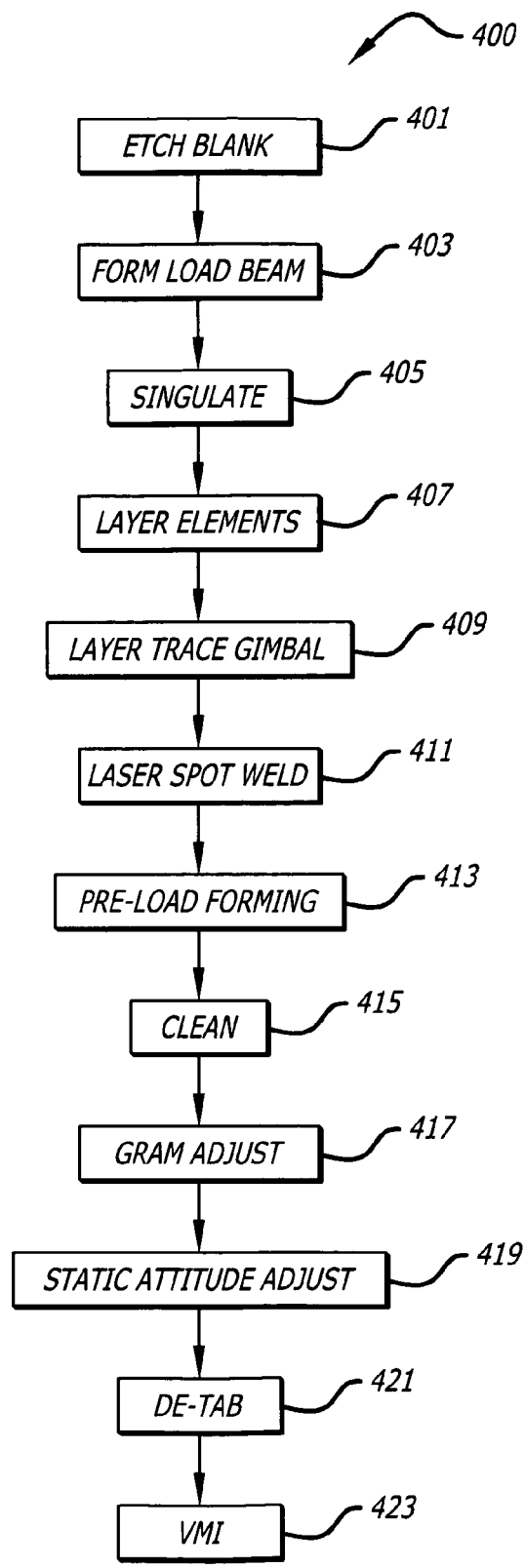
FIG. 4 is a simplified flowchart illustrating manufacturing a suspension assembly according to an embodiment of the present invention.
Figure 5:
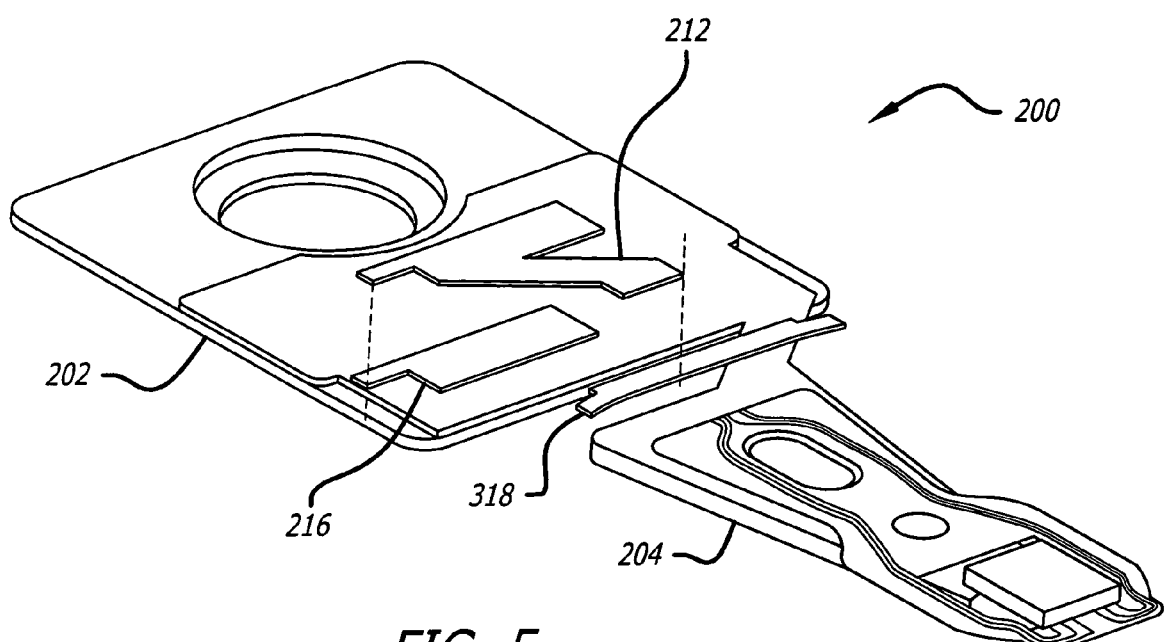

FIG. 4 shows a flow diagram for manufacturing a suspension according to an embodiment of the present invention. This diagram is merely an example, which should not unduly limit the scope of the claims herein. Although the present invention has been described using a particular series of steps, it should be apparent to those skilled in the art that the scope of the present invention is not limited to the described series of steps. For example, described steps can be performed in a different sequence, and one or more steps may be skipped altogether, without departing from the scope of the claims herein.

In step 401, a thin sheet of stainless steel is etched by photochemical etching to form the general shapes of a plurality of suspensions. Next, different stamping operations are carried out (e.g., rails and dimple) in step 403. In step 405, each load beam is singulated from the sheet. Component parts of the suspension assembly (such as a load beam, spacer member, hinge member, base plate, or combinations thereof) are next layered in step 407. To enable the reading and writing function of the head, a flexible polyimide and copper dielectric (trace) is attached to the head in step 409. Spot welding the layers together takes place in step 411. In a specific embodiment, a suspension assembly has areas that are four layer welded, as well as areas that are three and two layer welded. Alternatively, in other embodiments, layers of a suspension assembly can be coupled using a suitable rigid adhesive, such as epoxy.

In steps 413 and 415, each suspension assembly undergoes pre-load forming by rolling or coining forming and then cleaning. In an embodiment of the present invention, spring extensions are flat prior to pre-load forming (or as welded) and have an attitude of about a 0° roll angle before and after pre-load forming. Once pre-formed and cleaned, the suspension gram load is fine adjusted in step 417. The gram load of the suspension gives it the ability to maintain, a precise distance between the head and the disk to be read (fly height) by giving the load beam a pre-load force counteracting the air bearing created by the rotating disk. In step 419, the static attitude of each suspension is laser adjusted for accurate non-contact shaping of metallic components. Details of static attitude adjust are described in U.S. application Ser. No. 10/319,784 filed Dec. 12, 2002, which is incorporated herein for all purposes. Each suspension is finally sorted in step 421, and cleaned and visually inspected in step 423.

One of ordinary skill in the art would recognize many other variations, modifications, and alternatives. The above examples are merely illustrations, which should not unduly limit the scope of the claims herein. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A suspension assembly for a hard disk drive, the suspension assembly comprising:
    a load beam, the load beam includes a mounting region, a first spring extension on a first side of the load beam, and a rigid region;
    a hinge member, the hinge member includes a second spring extension coupling the rigid region and the mounting region on a second side of the load beam, the second side being opposite the first side about a longitudinal axis of the load beam;
    a first spacer disposed between the hinge member and the mounting region of the load beam;
    a second spacer disposed between the hinge member and the rigid region of the load beam; and
    a base plate coupled to the mounting region of the load beam; and
    a vertical offset between the first and second spring extensions predisposing the rigid region to move from a first position to a second position in response to a disk flutter.

2. The suspension assembly of claim 1 wherein the first side and the second side of the load beam are asymmetric.

3. The suspension assembly of claim 1 wherein the vertical offset is equal to a thickness of the first spacer.

4. The suspension assembly of claim 3 wherein the thickness of the first spacer is about equal to a thickness of the second spacer.

5. The suspension assembly of claim 1 wherein the first and second spring extensions are each orientated at about a 0° roll angle with respect to a plane defined by a platter, whereby an operating attitude of the load beam is substantially at a 0° roll angle.

6. The suspension assembly of claim 1 wherein the first side and the second side of the load beam are disposed an equal distance from a plane defined by a rotating platter.

7. The suspension assembly of claim 1 wherein the second spacer extends from the second side to the first side of the load beam to mass balance the suspension assembly.

8. The suspension assembly of claim 1 wherein the second spacer is symmetrical about a longitudinal axis of the load beam.

9. The suspension assembly of claim 1 wherein the second spring extension, mounting region, first spacer, and base plate are four layer welded.

10. The suspension assembly of claim 1 wherein the second spring extension, rigid region of the load beam, and second spacer are three layer welded.

11. The suspension assembly of claim 1 wherein the mounting region of the load beam is directly welded to the base plate.

12. The suspension assembly of claim 1 further comprising a flexure coupled to the rigid region of the load beam.

13. The suspension assembly of claim 1 wherein the vertical offset is in a range of about 10 microns to about 120 microns.

14. The suspension assembly of claim 1 wherein the vertical offset is configured to dispose the second spring extension closer to a rotating platter than the first spring extension.

15. The suspension assembly of claim 1 wherein the load beam comprises at least one rail formed along a majority of a length of the support section to provide increased stiffness to the support section.

16. The suspension assembly of claim 1 wherein the first spacer and the second spacer are formed from a single space member that is singulated after suspension welding.

17. A suspension assembly for a hard disk drive, the suspension assembly comprising:
a four layer region comprising:
    a base plate;
    mounting region of a load beam;
    a first spacer; and
    a hinge member;
a three layer region comprising:
    a rigid region of the load beam;
    a second spacer; and
    the hinge member;
wherein the four layer and three layer regions are coupled by a first spring extension of the load beam and a second spring extension of the hinge member, the first spring extension being disposed from the second spring extension by a vertical offset of at least about 10 microns.

18. The suspension assembly of claim 17 wherein the first spring extension and second spring extension each are orientated at about a 0° roll angle with respect to a plane defined by a platter, whereby an operating attitude of the load beam is substantially at a 0° roll angle.

19. A hard disk apparatus, the apparatus comprising:
a load beam having a mounting region, first spring extension on a first side, and a rigid region;
a hinge member coupling the mounting region and rigid region of the load beam on a second side by a second spring extension, the second side being disposed opposite the first side about a longitudinal axis of the load beam;
a first spacer disposed between hinge member and the mounting region;
a second spacer disposed between the hinge member and the rigid region;
a parallel offset in a first direction between the first and second spring extensions of at least about 10 microns;
a gimbal coupled to the load beam;
a read/write head coupled to the gimbal; and
a rotating platter disposed away from the load beam in the first direction;
wherein the first direction is perpendicular to the rotating platter.

20. The apparatus of claim 19 wherein the first and second spring extensions each are orientated at about a 0° roll angle with respect to a plane defined by the rotating platter, whereby an operating attitude of the load beam is substantially at a 0° roll angle.

21. The apparatus of claim 19 wherein the first and second spring extensions prior to pre-load forming are each flat and orientated at about a 0° roll angle.

22. The apparatus of claim 19 wherein a rotational speed of the platter is greater than about 5,000 rpm.

* * * * *

UNITED STATES PATENT AND TRADEMARK OFFICE
CERTIFICATE OF CORRECTION

PATENT NO. : 7,280,316 B1
APPLICATION NO. : 11/119364
DATED : October 9, 2007
INVENTOR(S) : Martin John McCaslin et al.

It is certified that error appears in the above-identified patent and that said Letters Patent is hereby corrected as shown below:

Title Page; item (75);
In the list of the inventors, the third listed inventor should read -- Sitthipong Footrakul--.

Signed and Sealed this

Twenty-seventh Day of November, 2007

JON W. DUDAS
*Director of the United States Patent and Trademark Office*